US 8,347,407 B2

(12) United States Patent
Uchida

(10) Patent No.: US 8,347,407 B2
(45) Date of Patent: Jan. 1, 2013

(54) AUTHORITY MANAGEMENT METHOD, SYSTEM THEREFOR, AND SERVER AND INFORMATION EQUIPMENT TERMINAL USED IN THE SYSTEM

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 12/523,853

(22) PCT Filed: Jan. 15, 2008

(86) PCT No.: PCT/JP2008/050345
§ 371 (c)(1),
(2), (4) Date: Jul. 20, 2009

(87) PCT Pub. No.: WO2008/090779
PCT Pub. Date: Jul. 31, 2008

(65) Prior Publication Data
US 2010/0083385 A1    Apr. 1, 2010

(30) Foreign Application Priority Data
Jan. 26, 2007    (JP) .................................. 2007-016561

(51) Int. Cl.
*H04L 9/00*    (2006.01)
(52) U.S. Cl. ................ 726/30; 713/150; 726/28; 726/29
(58) Field of Classification Search .................. 726/30
See application file for complete search history.

(56) References Cited

U.S. PATENT DOCUMENTS 5,602,918 A * 2/1997 Chen et al. .................... 713/153
6,367,016 B1 * 4/2002 Lambert et al. ............... 713/185
2006/0236117 A1 * 10/2006 Lazaridis et al. ............. 713/185
2008/0046734 A1 * 2/2008 Kilian-Kehr .................. 713/172
2008/0082825 A1 * 4/2008 Mizushima et al. .......... 713/172

FOREIGN PATENT DOCUMENTS

| CN | 1764115 A | 4/2006 |
| JP | 1997046330 A | 2/1997 |
| JP | 2002351744 A | 12/2002 |
| JP | 2003189360 A | 7/2003 |
| JP | 2004015507 A | 1/2004 |
| JP | 2004308257 A | 11/2004 |
| JP | 2004334756 A | 11/2004 |

(Continued)

OTHER PUBLICATIONS

Chinese Office Action for CN200880002879.6 dated Nov. 30, 2010.

(Continued)

*Primary Examiner* — Matthew Smithers

(57) ABSTRACT

There is provided an authority management system in which, when a data user discloses secret information only to a specific partner having the authority to receive the disclosure of the secret information, the information can be disclosed only if the correctness of the partner is confirmed in a face-to-face manner. A holder of disclosure data encrypts data, generates and divides a decryption key of the data, and sends a partial decryption key to a disclosure partner beforehand. At the time of data disclosure, the data holder physically meets a disclosure partner terminal. The partial decryption key is sent in a proximate state, and the decryption key is reproduced. With this, the data is decrypted and disclosed. Thus, the data holder meets the disclosure partner having the authority to receive the disclosure, and visually confirms the correctness of the partner.

28 Claims, 5 Drawing Sheets

FOREIGN PATENT DOCUMENTS

| | | |
|---|---|---|
| JP | 2005165631 A | 6/2005 |
| JP | 2005311781 | 11/2005 |
| JP | 2006053749 A | 2/2006 |
| JP | 2006121497 A | 5/2006 |
| JP | 200 173944 A | 6/2006 |

OTHER PUBLICATIONS

International Search Report for PCT/JP2008/050345 mailed May 1, 2008.

\* cited by examiner

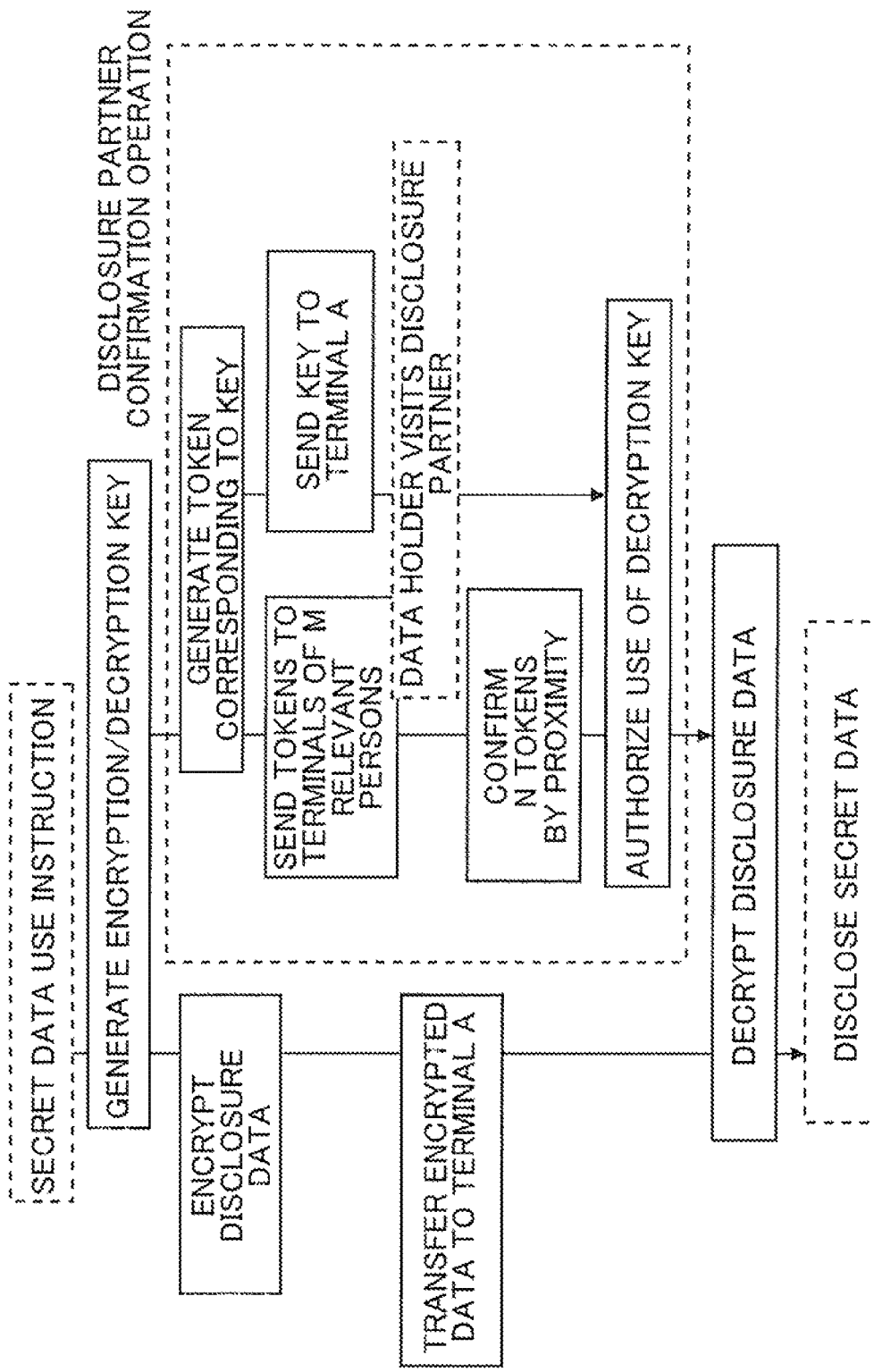

AUTHORITY MANAGEMENT METHOD, SYSTEM THEREFOR, AND SERVER AND INFORMATION EQUIPMENT TERMINAL USED IN THE SYSTEM

TECHNICAL FIELD

The present invention relates to an authority management method for information equipment having communication means, an authority management system, and a server and an information equipment terminal used in the system, and in particular, relates to an authority management method for information equipment having communication means for encrypting data and decrypting the data, an authority management system, and a server and an information equipment terminal used in the system.

BACKGROUND ART

In recent years, it has become common to store personal data such as telephone directories, schedules, and history information on exchanged mail in mobile terminals including cellular phones and personal digital assistants (PDA).

Further, it has become widespread to store and use business-related data, high-priced information and contents such as music and moving images.

In addition, as mobile terminals have recently become more sophisticated in functionality, it has become possible to share data with other mobile terminals, personal computers, and digital appliances through the use of a large-capacity portable memory device such as an SD card, a wired/wireless closed network (LAN), a communication function such as wireless proximity communication (Bluetooth (registered trademark)) and infrared communication.

In such a usage scene, it is required that the use of shared personal data, business data, contents, and the like is limited only to a specific user group or device group having the use authority, based on the protection of privacy, compliance with copyright laws, non-disclosure agreements, or information management rules. Examples of such a use management system are disclosed in PTL 1 to PTL 5.

PTL 1 discloses a system for sharing data in a certain user group in response to an access request from one member for data such as a schedule of another member stored in a mobile terminal.

In PTL 1, there is disclosed a method in which, if the mobile terminal of the member that has received the access request does not respond to the request due to power-off or the like, another mobile terminal which already shares the data responds to the access request as a proxy of the mobile terminal that has received the access request.

PTL 2 discloses a method of disclosing secret data when one user (requesting user) makes an access request for data of another user (requested user).

In PTL 2, there is disclosed a use management method for sending the data of the requested user only if the requesting user and the requested user belong to the same group described in attribute certificates which are given beforehand to them and referred to in response to the access request.

In PTL 3, one mobile terminal or other portable device possessed by one user is once authenticated by a digital device connected to a home network by wired or wireless connection, and the authentication time and the ID of the digital device are collected and stored by a home server.

PTL 3 discloses a system in which only the digital device having the ID registered within a specified time can share and reproduce the same entertainment contents stored in the home server.

PTL 4 discloses a network access method such that, in a wired or wireless network, a physical position of an access switch (base station) used for network connection is registered beforehand in a central server, and when the mobile terminal is connected to the access switch, authentication is performed on the basis of the two factors which are the ID of a mobile terminal and the physical position of the access switch.

PTL 5 discloses a method of sharing personal data such as a schedule and a telephone directory stored in a central server with another user through a mobile terminal.

In this invention, a sharable part (e.g., only a telephone number and a name in a telephone directory) in personal data is defined as a rule beforehand between a user (requesting user) who makes a share access request and another user (requested user) who receives the request. Further, a mail address one-to-one corresponding to the rule is defined.

At the time of making an access request for the personal data of the requested user through a mobile terminal, the requesting user transmits the access request along with a requesting user ID to a mail address corresponding to a desired disclosure scope. The central server which has received the access request refers to the rule. Only if the requested personal data falls within the scope of the defined sharable personal data, the central server sends the personal data of the scope to the requesting user.

CITATION LIST

Patent Literature

{PTL 1} JP-A No. 2003-189360
{PTL 2} JP-A No. 2004-015507
{PTL 3} JP-A No. 2004-334756
{PTL 4} JP-A No. 2005-311781
{PTL 5} JP-A No. 2006-053749

SUMMARY OF INVENTION

Technical Problem

However, none of the methods disclosed in PTL 1 to PTL 5 enables elaborate use management of secret data such as personal data, entertainment contents, or business data stored in the terminal, in which the data can be disclosed only to a specific disclosure partner having the disclosure authority only if the partner can be confirmed in a face-to-face manner.

For example, assume that business data is disclosed only to a specific disclosure partner Y. If the business data is sent to the disclosure partner Y by email, the disclosure partner Y may show the data to another person that does not have the authority to receive the disclosure of the secret data. Further, a method in which a data user X to disclose the data visits the disclosure partner Y, with the data saved in a transportable storage medium, and discloses the data to the disclosure partner Y in a face-to-face manner may cause the data user X to disclose, through negligence or with malicious intent, the data to another person that does not have the authority to receive the disclosure as described.

Although it is possible to impose restrictions on the disclosure by designating a place where the data is disclosed such as the office of the disclosure partner Y and using position information such as GPS (Global Positioning System), there is a problem that an error occurs or it is difficult to measure the place accurately in a building.

Accordingly, it is an object of the present invention to provide a use management system in which, when a data user discloses secret information only to a specific partner, the information can be disclosed only if it is confirmed in a face-to-face manner that the partner has the authority.

Solution to Problem

According to a first aspect of the present invention, there is provided an authority management method in a data transmission system having a secret information management server and an information equipment terminal having communication means. The authority management method includes a data transmission step of transmitting information necessary to enable use of secret information from the secret information management server to an information equipment terminal of a correct use-authorized partner beforehand, a step of storing the transmitted information in the information equipment terminal of the correct use-authorized partner, a partner confirmation step of confirming storage of the transmitted information in the information equipment terminal when use of the secret information is needed, and a step of enabling the use of the secret information by confirming the storage.

According to a second aspect of the present invention, there is provided an authority management system having a secret information management server and an information equipment terminal having communication means. The data transmission system includes data transmission means for transmitting information necessary to enable use of secret information from the secret information management server to an information equipment terminal of a correct use-authorized partner beforehand, means for storing the transmitted information in the information equipment terminal of the correct use-authorized partner, partner confirmation means for confirming storage of the transmitted information in the information equipment terminal when use of the secret information is needed, and means for enabling the use of the secret information by confirming the storage.

According to a third aspect of the present invention, there is provided a server for managing secret information, including means for encrypting data, means for generating information necessary to decrypt the encrypted data, and data transmission means for transmitting the information necessary for the decryption to a mobile information terminal.

According to a fourth aspect of the present invention, there is provided an information equipment terminal for storing secret information, including means for storing information necessary for the decryption transmitted from a secret information management server, means for acquiring the information necessary for the decryption from another information equipment terminal by proximity communication, and means for reproducing the stored secret information to a usable state, using the information necessary for the decryption.

According to a fifth aspect of the present invention, there is provided a program for operating a computer as a server for managing secret information. The server includes means for encrypting data, means for generating information necessary to decrypt the encrypted data, and data transmission means for transmitting the information necessary for the decryption to a mobile information terminal.

According to a sixth aspect of the present invention, there is provided a program for operating a computer as an information equipment terminal for storing secret information. The information equipment terminal includes means for storing information necessary for the decryption transmitted from a secret information management server, means for acquiring the information necessary for the decryption from another information equipment terminal by proximity communication, and means for reproducing the stored secret information to a usable state, using the information necessary for the decryption.

Advantageous Effects of Invention

The invention can provide a use management system in which, by sending beforehand a part of a decryption key to the terminal of a partner having the authority and confirming proximity to the terminal, the decryption key can be used, so that in the case of disclosing personal data, entertainment contents, business data, or the like only to a specific disclosure partner, the data can be disclosed only if it is confirmed in a face-to-face manner that the partner has the authority, and thus a stricter disclosure condition is applied.

BRIEF DESCRIPTION OF DRAWINGS

FIG. 5 A conceptual diagram showing the operation of an embodiment of the invention.

DESCRIPTION OF EMBODIMENTS

Embodiment 1

Embodiment 1-1

Configuration of Embodiment

Figure 1:
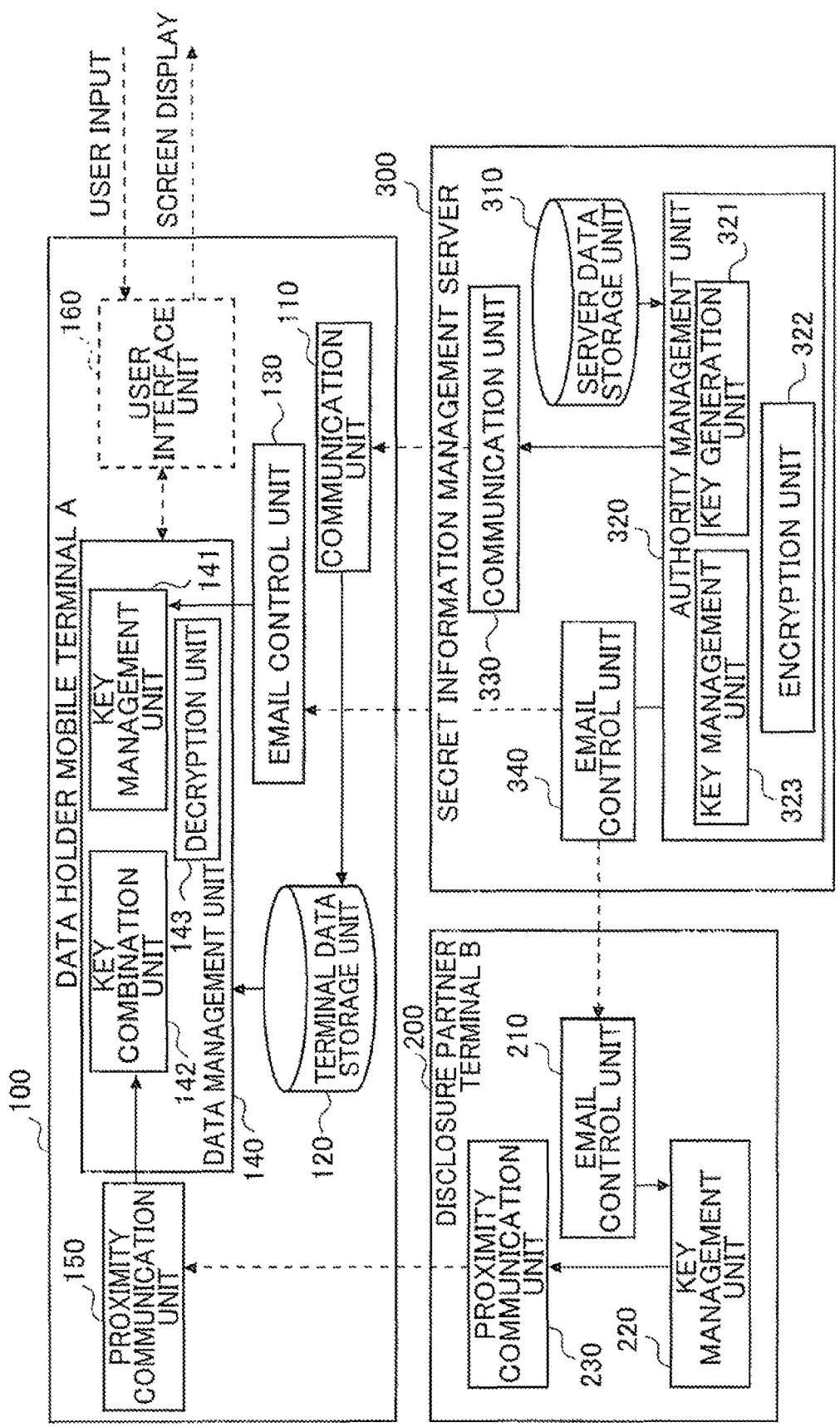
FIG. 1 A diagram showing a configuration example of the invention.

First, the basic configuration of this embodiment will be described with reference to FIG. 1.

A secret information management server 300 includes the following units. Secret information to be disclosed to limited disclosure partners is stored in a server data storage unit 310. An authority management unit 320 includes a key generation unit 321 for generating an encryption key, an encryption unit 322 for encrypting the secret information by means of this key, and a key management unit 323 for dividing this key into two parts complementing each other. A communication unit 330 sends the encrypted secret data to a data holder mobile terminal A. An email control unit 340 sends email in which a divided key is embedded to the data holder mobile terminal A and a disclosure partner terminal B of a disclosure partner having the authority to receive the disclosure.

The disclosure partner terminal B includes the following units. The email sent from the secret information management server 300 is received by an email control unit 210, and a part of the decryption key contained therein is stored in a key management unit 220. This key is sent to the data holder mobile terminal A through a proximity communication unit 230 at the time of a request for data disclosure.

The data holder mobile terminal A includes the following units. A communication unit 110 writes the secret data sent from the secret information management server 300 to a terminal data storage unit 120. A part of the decryption key embedded in the email received by an email control unit 130 is stored in a key management unit 141 of a data management unit 140. The part of the decryption key received from the disclosure partner terminal B through a proximity communication unit 150 is combined with the other part by a key combination unit 142. The secret data stored in the terminal data storage unit 120 is decrypted by a decryption unit 143, using the combined decryption key. This disclosure data is disclosed to the disclosure partner through a user interface unit 160.

Embodiment 1-2

Operation of Embodiment

Figure 3:
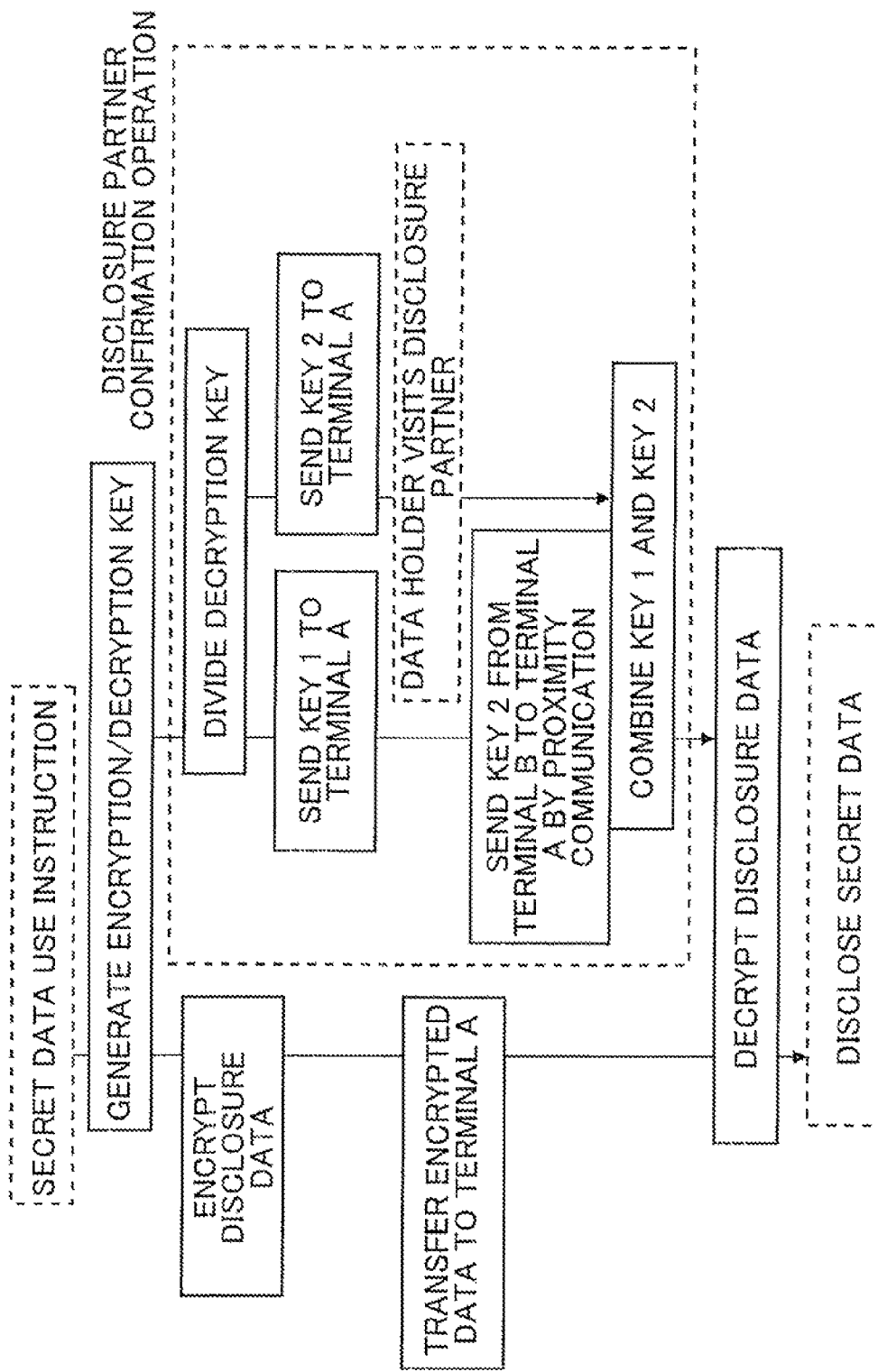
FIG. 3 A conceptual diagram showing the operation of an embodiment of the invention.

Referring to FIG. 3, description will be made of the operation of the embodiment with the above configuration, for example, an operation in which secret data stored on the secret information management server 300 is stored in the data holder mobile terminal A of a data holder X, and is brought and disclosed to a disclosure partner Y having the authority to receive the disclosure.

First, an encryption/decryption key for encrypting and decrypting secret data is generated, and the secret data is encrypted with the encryption/decryption key. The encryption may be performed with a symmetric key scheme such as DES (Data Encryption Standard) or AES (Advanced Encryption Standard) or with an asymmetric key scheme such as RSA (Rivest Shamir Adleman). The encrypted secret data is transferred to the data holder mobile terminal A through a public line, a wireless LAN, or a storage medium such as an SD card.

The decryption key for decrypting the data is divided into two parts, both of which are necessary for decryption, and one partial decryption key is stored in the data holder mobile terminal A. The partial decryption key may be contained in email and sent to the data holder mobile terminal A from the authority management unit 320, or may be transferred through a LAN or a storage medium such as an SD card to the data holder mobile terminal A in the same way as the secret data.

Further, the other partial decryption key is contained in email and sent to the pre-obtained address of the disclosure partner terminal B possessed and used by the disclosure partner Y, and is stored in the disclosure partner terminal B.

When the data holder X discloses the data to the disclosure partner Y, the data holder X physically visits and meets the disclosure partner Y. After the data holder X visually confirms the disclosure partner Y, the part of the decryption key stored in the disclosure partner terminal B of the disclosure partner Y is transferred to the data holder mobile terminal A.

This transfer can be performed in any manner as long as the proximity of the data holder mobile terminal A to the disclosure partner terminal B is guaranteed.

To transfer the part data of the decryption key, for example, inter-IC-card communication means having a non-contact communication function such as FeliCa (registered trademark) or proximity communication means such as Bluetooth (registered trademark) can be used. Such communication means requiring proximity enables the data holder X to meet, in person, the disclosure partner Y having the authority to receive the disclosure and confirm that the communication partner is Y.

Further, the disclosure partner Y also can confirm that the data holder is X.

The part of the decryption key transferred from the disclosure partner terminal B to the data holder mobile terminal A by the proximity communication means is combined with the part of the decryption key stored in the data holder mobile terminal A so that the decryption key is reproduced. The secret data stored in the data holder mobile terminal A is decrypted with the reproduced decryption key. The decrypted data is disclosed to the disclosure partner Y in such a way as to be displayed on a screen through the user interface unit 160.

Further, to prevent disclosure to another unintended person having no authority after the confirmation of the disclosure partner Y, it is also effective to set the term of validity on each of the key transferred from the disclosure partner terminal B to the data holder mobile terminal A, the reproduced decryption key, and the decrypted secret data. For example, it is possible to adopt a scheme for deleting the data after a lapse of five minutes. In the case of extending the term of validity of certification for having the authority to receive the disclosure, it is possible to request a procedure such as confirmation of proximity by proximity communication between the disclosure partner terminal B and the data holder mobile terminal A again.

Embodiment 2

In the above-described embodiment, the decryption key is divided, and the partial key is transferred from the disclosure partner terminal B to the data holder mobile terminal A by proximity communication between the terminals. In another embodiment capable of achieving a similar effect, a decryption key which is not divided is stored in the data holder mobile terminal A. The decryption key cannot be operated from the outside and can be used only if a certain condition holds.

Figure 2:
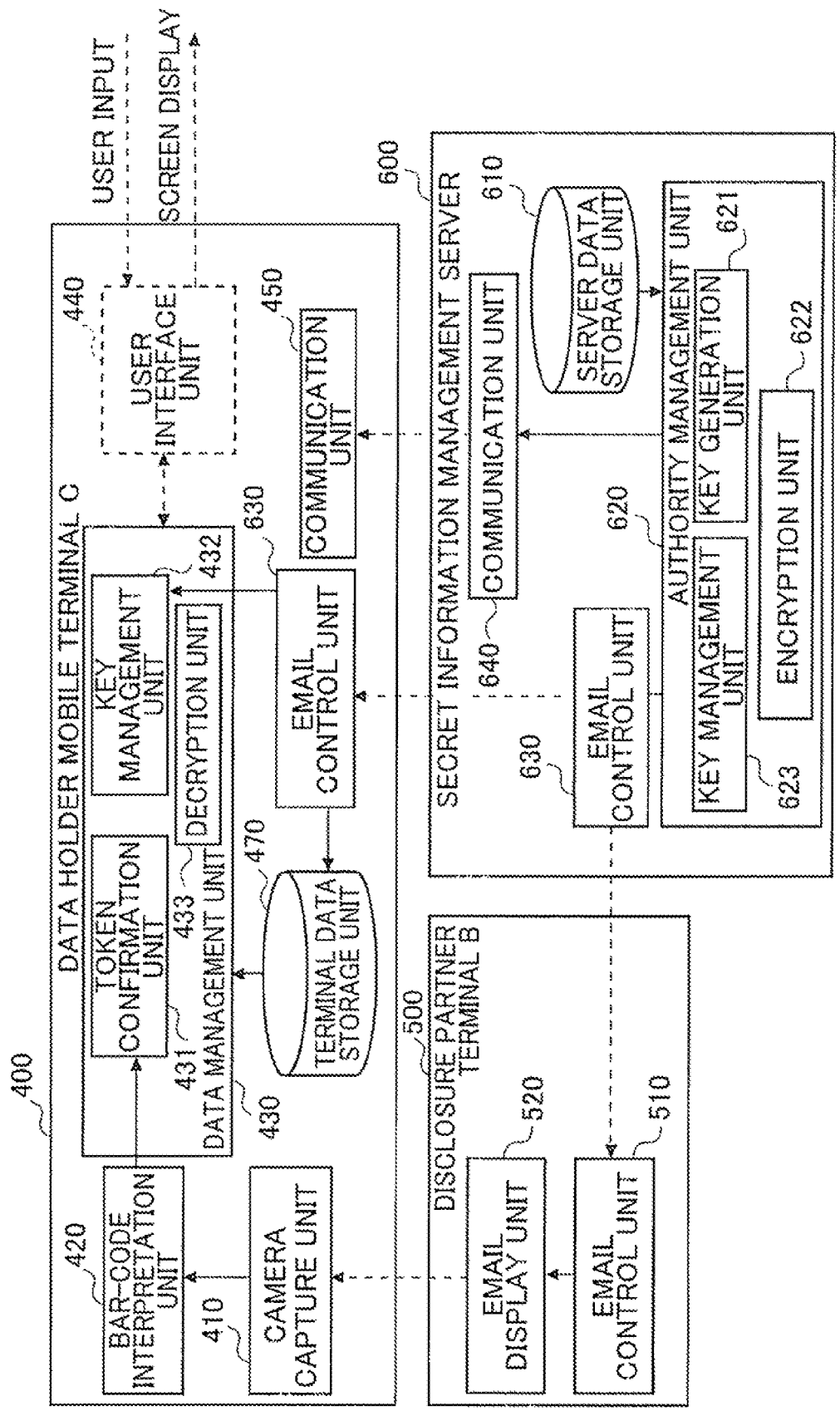
FIG. 2 A diagram showing a configuration example of the invention.
Figure 4:
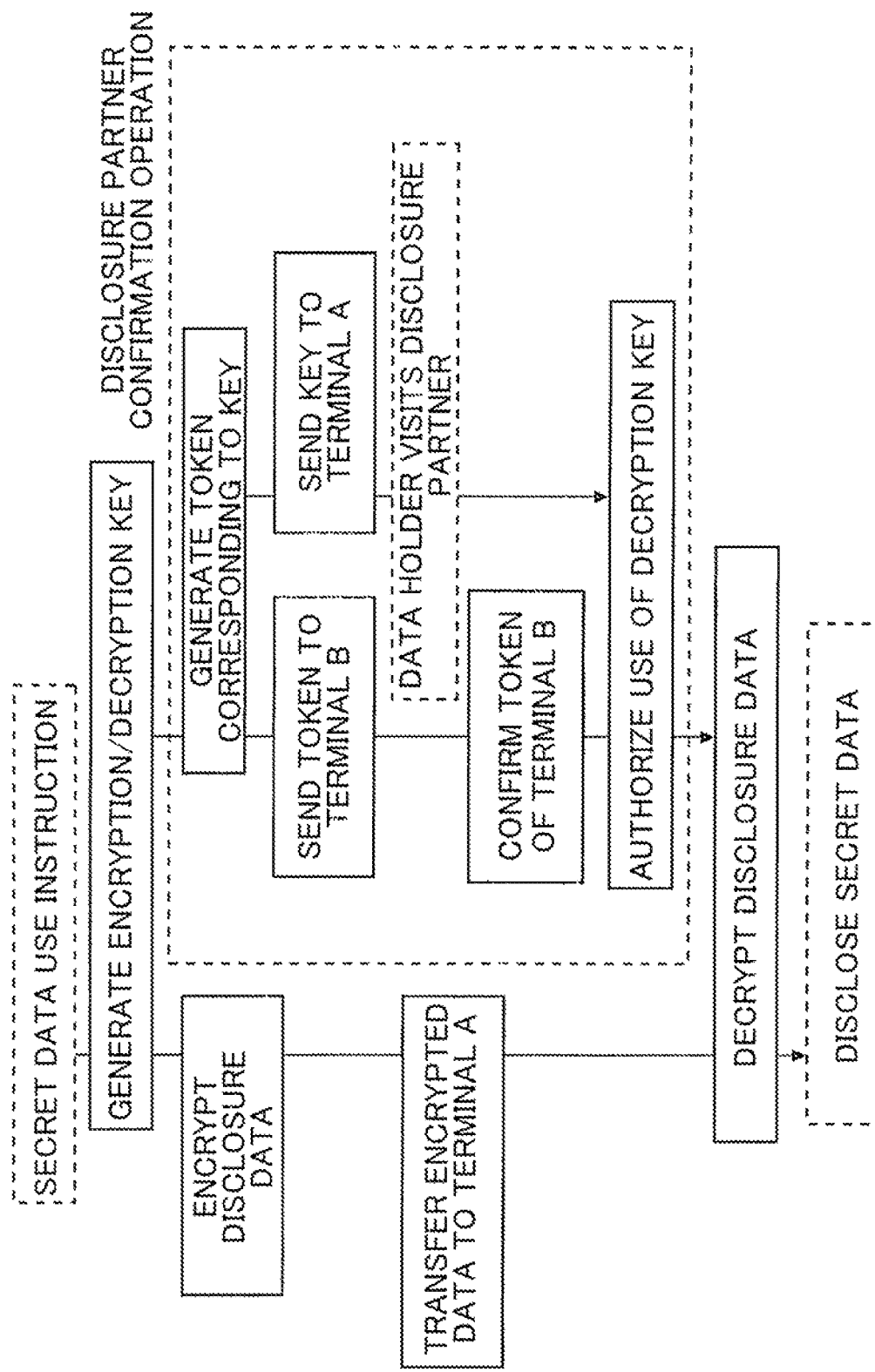
FIG. 4 A conceptual diagram showing the operation of an embodiment of the invention.

The configuration and operation of the second embodiment will be described with reference to FIGS. 2 and 4.

First, in this embodiment, a key management unit 623 of an authority management unit 620 of a secret information management server 600 generates a unique token corresponding to a decryption key.

The key is sent to and stored in a data holder mobile terminal C, and managed so as to be usable only if the presence of the corresponding token is confirmed.

The token is converted to, for example, a corresponding bar-code format and attached to mail to be sent to a disclosure partner terminal D from the server. QR code (Quick Response Code) (registered trademark) is one example of the bar-code format.

Next, in a disclosure partner confirmation operation, an email control unit 510 of the disclosure partner terminal D uses mail software to display the token converted to the bar-code format on an email display unit 520 of the disclosure partner terminal D.

A camera capture unit 410 contained in the data holder mobile terminal C captures the token, and a bar-code interpretation unit 420 in the data holder mobile terminal C translates the bar code into a token value, thus confirming the content. If the correctness of the token is confirmed, it becomes possible to use the decryption key and disclose the secret data to the disclosure partner having the authority to receive the disclosure.

It is possible to carry out this embodiment between terminals without proximity communication means if they have only a camera function and therefore achieve the invention at lower cost and with more ease compared to the first embodiment.

Further, it is also possible to confirm the correctness of the token when the data holder X inputs the character string through an input device such as a numeric keypad of the data holder mobile terminal C while viewing the sent token, a hash value generated by performing a hash function on the token, or one converted under a given rule such as re-encryption, displayed on the email display unit 520 in the disclosure partner terminal D.

Embodiment 3

In addition, the third embodiment is an embodiment for confirming the correctness of the disclosure partner with more reliability. The basic configuration of this embodiment is the same as that of the first and second embodiments. To carry out the following embodiment, a plurality of disclosure partner terminals B or D are required.

The operation of the third embodiment will be described below. FIG. 5 corresponds to this embodiment.

In the first and second embodiments, one disclosure partner has the authority to receive the disclosure. In the third embodiment, to determine the correctness of the disclosure partner with more reliability, divided decryption keys or tokens are distributed beforehand to a plurality of disclosure partners having the authority to receive the disclosure. For example, divided decryption keys or tokens are distributed beforehand to a plurality of persons in a disclosure department. Further, all of the divided decryption keys or tokens are required for decryption of data.

If it is confirmed through proximity communication means that all the divided decryption keys or tokens are complete at the time of data disclosure, it is possible to reduce the risk that only some malicious persons disclose the data to an unexpected third person who does not have the authority to receive the disclosure, thus enabling more reliable authority management.

Further, not only the condition that all the persons to whom tokens are distributed are complete as described, but also another condition can be set.

For example, tokens corresponding to partial tickets (e.g., stubs) of disclosure authority are sent beforehand to ten relevant persons to whom the data is to be disclosed. Further, if the tokens of five persons of them can be confirmed on site through proximity communication means, the data can be disclosed through the use of the decryption key.

With such an embodiment, it is also possible to achieve a management system resistant to the presence of a malicious relevant person flexibly depending on the situation. This operation is shown in FIG. 5. In FIG. 5, tokens are distributed to M persons. When the tokens of N persons of them can be confirmed, the data can be disclosed. The case where M is equal to N corresponds to the case of confirming all the persons as described above.

In the above embodiments, it can desirably be confirmed that the partial decryption key or token sent to the disclosure partner terminal B or D is currently used surely only by the disclosure partner Y having the authority to receive the disclosure.

To this end, it is desirable that restriction is imposed on mail containing the partial decryption key or token so as to make it nontransferable. To achieve this, the following method is also effective, instead of adopting a method for delivering mail to the terminal. Mail text is stored on a mail server, like Web-based mail. At the time of browsing or using data, a request for browsing or use of data is made through access to the server from the specific disclosure partner terminal B or D, thus using the data.

Moreover, it can desirably be confirmed with a more reliable method such as biometric authentication that the user of the disclosure partner terminal B or D is surely the disclosure partner Y.

In addition, it is more desirable that the history (log) of the times when related actions such as identity confirmation by password input or biometric authentication of the terminal user and the confirmation and decryption of the partial decryption key or token are carried out, terminal states, and the like can be stored.

This enables the confirmation and verification of the status of authority management and data disclosure by referring to the history information at a later date, thus making it possible to provide a more reliable use management system.

While the invention has been described from an aspect of managing the secret data which is business data in the above examples, the invention can be used also in the case of giving or lending a right to use a purchased electronic ticket, music/video content, or the like.

For example, there can also be adopted a data management method in which a token corresponding to the so-called stub of the right of use is sent beforehand by mail and the other stub is retained by a parson concerned who can complete the assignment after meeting and confirming the partner.

Further, the invention is widely applicable not only to the above assignment but also to other applications. For example, the invention is applicable to the entrance management of events such as a concert, an amusement park, and the like. More specifically, the host first requests the registration of an address from a person having a right to participate in the event.

If the address has been registered, the host sends a stub to the registered address beforehand, and the stub is stored in a mobile terminal such as a cellular phone or a PDA of the participant. After that, by confirming the correspondence relationship between the stub stored in the mobile terminal and a stub retained by a host manager through proximity communication means at the entrance to the venue, it can be confirmed that the participant has the entrance authority. This enables the entrance management to which a stricter disclosure condition is applied.

Further, in the invention, by sending a different stub to each person, it is possible not only to confirm entrance authority, but also to distinguish a mobile terminal holder as a specific individual.

Further, this embodiment is also applicable to election voting management which requires further individual identification. That is, it is possible not only to perform the simple entrance management as described above at a polling place, but also to confirm the identity of a person who votes. Further, by sending a different stub to each person, it is also possible to perform seat management at theaters and the like.

As described above, the invention can advantageously provide a use management system in which, in the case of disclosing business data only to a specific disclosure partner Y by sending beforehand a part of the decryption key to the terminal of the partner having the authority to receive the disclosure and confirming proximity to the terminal, the data can be disclosed only if the partner is confirmed in a face-to-face manner.

Further, partners to be confirmed by proximity can be all of an arbitrary plurality of partners or several of them.

In addition, the so-called stub is used as business data to be confirmed by proximity to the terminal, thereby enabling application from an aspect of authority management and use for entrance management, seat management, and the like.

Thus, the combination of direct communication (email) to a disclosure partner's possession and the confirmation of proximity makes the disclosure condition stricter, so that not only the above embodiments but also a wide variety of applications become available.

This application is the National Phase of PCT/JP2008/050345, filed Jan. 15, 2008, which is based upon and claims the benefit of priority from Japanese patent application No. 2007-016561, filed on Jan. 26, 2007, the disclosure of which is incorporated herein in its entirety by reference.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

INDUSTRIAL APPLICABILITY

The invention is applicable in the case of disclosing personal data, entertainment contents, business data, or the like only to a specific disclosure partner.

REFERENCE SIGNS LIST

100: Data holder mobile terminal A
110: Communication unit
120: Terminal data storage unit
130: Email control unit
140: Data management unit
141: Key management unit
142: Key combination unit
143: Key decryption unit
150: Proximity communication unit
160: User interface unit
200: Disclosure partner terminal B
210: Email control unit
220: Key management unit
230: Proximity communication unit
300: Secret information management server
310: Server data storage unit
320: Authority management unit
321: Key generation unit
322: Key encryption unit
323: Key management unit
330: Communication unit
340: Email control unit
400: Data holder mobile terminal C
410: Camera capture unit
420: Bar-code interpretation unit
430: Data management unit
431: Token confirmation unit
432: Key management unit
433: Decryption unit
440: User interface unit
450: Communication unit
460: Email control unit
470: Terminal data storage unit
500: Disclosure partner terminal D
510: Email control unit
520: Email display unit
600: Secret information management server
610: Server data storage unit
620: Authority management unit
621: Key generation unit
622: Encryption unit
623: Key management unit
630: Email control unit
640: Communication unit

The invention claimed is:

1. An authority management method in a data transmission system having a first information equipment terminal including communication unit and storing secret information, a secret information management server, and a second information equipment terminal being able to communicate with the first information equipment terminal and the secret information management server, the authority management method comprising:
a data transmission step of transmitting information necessary to enable use of the secret information from the secret information management server to the second information equipment terminal of a correct use-authorized partner beforehand;
a step of storing the transmitted information in the second information equipment terminal;
a partner confirmation step of confirming, by the first information equipment terminal, storage of the transmitted information in the second information equipment terminal when use of the secret information is needed; and
a step of enabling, by the first information equipment terminal, the use of the secret information by confirming the storage.

2. The authority management method according to claim 1, further comprising:
a step of encrypting the secret information beforehand by the secret information management server; and
a step of decrypting the encrypted secret information by the first information equipment terminal of a data holder on condition of the confirmation of the storage.

3. The authority management method according to claim 1, wherein the transmission to the use-authorized partner is carried out by sending an email to the second information equipment terminal.

4. The authority management method according to claim 3, wherein the email is nontransferable.

5. The authority management method according to claim 1, wherein the step of confirming the storage in the second information equipment terminal is carried out by proximity communication between the first and second information equipment terminals.

6. The authority management method according to claim 1, wherein the information transmitted to and displayed on the second information equipment terminal is captured by a camera of the first information equipment terminal, thereby achieving the step of confirming the storage in the second information equipment terminal.

7. The authority management method according to claim 2, further comprising:
a step of transmitting a part of a secret key necessary to decrypt the secret information to the second information equipment terminal.

8. The authority management method according to claim 1, further comprising:
a step of transmitting information necessary to enable use of the secret information to a plurality of partners,
wherein confirmation of storage in all of a plurality of the second information equipment terminals to which the information is transmitted or a given number of the second information equipment terminals or more enables the use of the secret information.

9. The authority management method according to claim 1, further comprising:
a step of housing unit for performing all or part of the step of confirming the storage and the step of enabling the use of the secret information in the first information equipment terminal.

10. The authority management method according to claim 1, wherein different data for each correct use-authorized partner is transmitted to the second information equipment terminal of each use-authorized partner.

11. An authority management system having a first information equipment terminal including communication unit and storing secret information, a secret information management server, and a second information equipment terminal being able to communicate with the first information equipment terminal and the secret information management server,
the secret information management server comprising data transmission unit for transmitting information necessary to enable use of the secret information from the secret information management server to the second information equipment terminal of a correct use-authorized partner beforehand,
the second information equipment terminal comprising a unit for storing the transmitted information,
the first information equipment terminal comprising a partner confirmation unit for confirming storage of the transmitted information in the second information equipment terminal when use of the secret information is needed, and a unit for enabling the use of the secret information by confirming the storage.

12. The authority management system according to claim 11, wherein
the secret information management server comprises a unit for encrypting the secret information beforehand; and
the first information equipment terminal of a data holder comprises a unit for decrypting the encrypted secret information on condition of the confirmation of the storage.

13. The authority management system according to claim 11, wherein the transmission to the use-authorized partner is carried out by sending an email to the second information equipment terminal.

14. The authority management system according to claim 13, wherein the email is nontransferable.

15. The authority management system according to claim 11, wherein the partner confirmation unit confirms the storage in the second information equipment terminal by proximity communication between the first and second information equipment terminals.

16. The authority management system according to claim 11, wherein the information transmitted to and displayed on the second information equipment terminal is captured by a camera of the first information equipment terminal, thereby achieving the unit for confirming the storage in the second information equipment terminal.

17. The authority management system according to claim 12, wherein
the secret information management server comprises a unit for transmitting a part of a secret key necessary to decrypt the secret information to the second information equipment terminal.

18. The authority management system according to claim 11, wherein
the secret information management server comprise a unit for transmitting information necessary to enable use of the secret information to a plurality of partners,
wherein confirmation of storage in all of a plurality of the second information equipment terminals to which the information is transmitted or a given number of the second information equipment terminals or more enables the use of the secret information.

19. The authority management system according to claim 11, wherein
the first information equipment terminal houses all or part of the unit for confirming the storage and the unit for enabling the use of the secret information.

20. The authority management system according to claim 11, wherein different data for each correct use-authorized partner is transmitted to the second information equipment terminal of each use-authorized partner.

21. A server in a data transmission system having a first information equipment terminal including communication unit and storing secret information, a secret information management server, and a second information equipment terminal being able to communicate with the first information equipment terminal and the secret information management server, the server comprising:
a unit for encrypting data;
a unit for transmitting the encrypted data as the secret information to the first information equipment terminal;
a unit for generating information necessary to decrypt the encrypted data; and
a data transmission unit for transmitting the information necessary for the decryption to the second information equipment terminal.

22. The server for managing secret information according to claim 21, further comprising:
a unit for dividing the information necessary to decrypt the data into a plurality of units incapable of decrypting the data alone,
wherein the information necessary to decrypting the data is transmitted in units to a plurality of the second information equipment terminals.

23. An information equipment terminal as a first information equipment terminal in a data transmission system having the first information equipment terminal including communication unit and storing secret information, a secret information management server, and a second information equipment terminal being able to communicate with the first information equipment terminal and the secret information management server, the information equipment terminal comprising:
a unit for storing first information necessary for the decryption transmitted from a the secret information management server;
a unit for acquiring second information necessary for the decryption from the second information equipment terminal by proximity communication; and
a unit for reproducing the stored secret information to a usable state, using the first and second information necessary for the decryption.

24. The information equipment terminal according to claim 23, wherein, to make the secret information usable, the information equipment terminal needs to confirm that the second information necessary to decrypt the data is stored in all of a plurality of the second information equipment terminals to which the information is transmitted or a given number of the second information equipment terminals or more.

25. A non-transitory computer-readable medium which embodies a computer program for operating a computer as a server in a data transmission system having a first information equipment terminal including communication unit and storing secret information, a secret information management server, and a second information equipment terminal being able to communicate with the first information equipment terminal and the secret information management server, the server comprising:
a unit for encrypting data;
a unit for transmitting the encrypted data as the secret information to the first information equipment terminal;
a unit for generating information necessary to decrypt the encrypted data; and
a data transmission unit for transmitting the information necessary for the decryption to the second information equipment terminal.

26. The non-transitory computer-readable medium according to claim 25, the server further comprising:
a unit for dividing the information necessary to decrypt the data into a plurality of units incapable of decrypting the data alone,
wherein is transmitted in units to a plurality of the second information equipment terminals.

27. A non-transitory computer-readable medium which embodies a computer program for operating a computer as a first information equipment terminal in a data transmission system having the first information equipment terminal including communication unit and storing secret information, a secret information management server, and a second information equipment terminal being able to communicate with the first information equipment terminal and the secret information management server, the first information equipment terminal comprising:
a unit for storing first information necessary for the decryption transmitted from the secret information management server;
a unit for acquiring second information necessary for the decryption from the second information equipment terminal by proximity communication; and
a unit for reproducing the stored secret information to a usable state, using the first and second information necessary for the decryption.

28. The non-transitory computer-readable medium according to claim 27, wherein, to make the secret information usable, the information equipment terminal needs to confirm that the second information necessary to decrypt the data is stored in all of a plurality of the second information equipment terminals to which the information is transmitted or a given number of the second information equipment terminals or more.

* * * * *